United States Patent [19]

Vergnolle

[11] Patent Number: 5,283,851
[45] Date of Patent: Feb. 1, 1994

[54] OPTICAL INTERCONNECTION STRIP

[75] Inventor: Claude Vergnolle, Limours, France

[73] Assignee: Thomson-CSF, Puteaux, France

[21] Appl. No.: 947,797

[22] Filed: Sep. 21, 1992

[30] Foreign Application Priority Data

Oct. 8, 1991 [FR] France ................. 91 12348

[51] Int. Cl.⁵ .............................................. G02B 6/42
[52] U.S. Cl. ......................................... 385/134; 385/135
[58] Field of Search ............... 385/134, 135, 136, 137, 385/139, 88, 89, 92

[56] References Cited

U.S. PATENT DOCUMENTS

| | | | |
|---|---|---|---|
| 3,777,154 | 12/1973 | Lindsey | 250/227.11 |
| 3,792,239 | 2/1974 | Ohlhaber et al. | 359/188 |
| 4,184,740 | 1/1980 | d'Auria et al. | 385/46 |
| 4,678,264 | 7/1987 | Bowen et al. | 385/88 |
| 4,863,232 | 9/1989 | Kwa | 385/88 |
| 5,142,606 | 8/1992 | Carney et al. | 385/134 |
| 5,155,784 | 10/1992 | Knott | 385/88 |

FOREIGN PATENT DOCUMENTS 0237237 9/1987 European Pat. Off. ....... G02B 6/42
8508153 6/1985 Fed. Rep. of Germany .......... G02B 5/176

Primary Examiner—Frank Gonzalez
Attorney, Agent, or Firm—Oblon, Spivak, McClelland, Maier & Neustadt

[57] ABSTRACT

The strip is designed to optically interconnect a set of printed circuit boards mounted in a housing. It comprises:

a U-section (29) lying alongside and against the edge of the set of printed circuit boards with its back (30) turned towards the printed circuit boards and including two lateral flanges, the back containing apertures (39, ..., 44) drilled at the same pitch as the spacing of the printed circuit boards and optical fibers (37, 38) laid in the section (29), running from one aperture (39, ..., 44) to another, each aperture (39, ..., 44) drilled in the back (30) of the said section (29) and containing one or several optical fiber (37, 38) ends lying opposite an optical half-connector mounted on the edge of one of the printed circuit boards.

23 Claims, 4 Drawing Sheets

OPTICAL INTERCONNECTION STRIP

BACKGROUND OF THE INVENTION

This invention is a method of interconnecting a set of printed circuit daughterboards mounted in a housing with their edges plugged into electrical connectors mounted on a motherboard forming the cage backplane.

Both the density and number of contacts in backplane electrical connectors are limited by mechanical considerations and space problems while the frequency of electrical signals transmitted is limited by the significant changes in form which exist at the contact position. They form a veritable bottleneck in the flow of data between printed circuit boards but it should be possible to overcome this problem using optical connectors.

Optical connectors are capable of transmitting very high frequency signals—several gigahertz—and are currently only limited by the performance of electro-optical interfaces. They also make it possible to split the power in very high frequency signals far more easily than with electrical connectors and coaxial or three-layer lines.

DESCRIPTION OF THE PRIOR ART

Optical connections are still little used to link printed circuit boards housed in the same casing. However, optical fibers are used for wire-to-wire connection between boards. Single-fiber connectors, which are mounted in the backplane electrical connectors, in the recesses provided for coaxial or power cables, already exist. However, this type of connection has the disadvantage of using single optical fibers, i.e. of being suitable only for point-to-point connection, with a low obtainable density and delicate positioning.

They are also direct optical links between printed circuit boards in a given housing which use optoelectronic components placed in direct line-of-sight on the edge of the printed circuit boards. With this system, positioning is not particularly critical provided that the light beams are sufficiently divergent; however, the power of the light beams restricts the transmission distance and the number of lines is restricted since the optical receivers must have a direct view of the optical transmitters and must not mask each other.

SUMMARY OF THE INVENTION

This invention is a method of optically interconnecting printed circuit boards in a given housing which offers the possibility of high density and non-critical positioning of inputs-outputs.

It is a strip to optically interconnect a set of printed circuit boards mounted in a housing. This strip comprises:

- a U-section running alongside and against one edge of the stack of printed circuit boards with its back turned towards them, with two side flanges and with holes at the same pitch as the spacing of the printed circuit boards in the stack and
- optical fibers running in the U-section, between its side flanges, from one aperture to another.

Each aperture in the U-section accommodates the ends of one or several optical fibers lying opposite the half-optical connector mounted on the edge of a board in the stack.

When the edges of the printed circuit boards are plugged into connectors attached to the backplane, the U-section in the strip may either be beneath the backplane, at the position reserved for the coaxial cables and power conductors, or above it, alongside the row of electrical connectors or on one side or even on the top of the printed circuit board stack above the backplane. In all cases, it forms a compact, easily handled optical fiber interconnection assembly for the printed circuit board housing.

BRIEF DESCRIPTION OF THE DRAWINGS

The invention will be better understood and other advantages will become clear upon reading the following description of various examples of embodiments, this description being based on the appended figures of which:

FIG. 1 is a transverse cross-section on a printed circuit board housing 1 with its hinged lid 2. Housing 1 contains a stack of printed circuit boards 3, known as daughterboards, mounted in slides, not shown, plugged side by side into a backplane printed circuit board 8, known as the motherboard, via extractable electrical connectors 4, 5, 6 and 7 mounted on their edges. The motherboard carries the electrical conductors required to electrically their edges. The motherboard carries the electrical conductors required to electrically interconnect the various daughterboards. A space 9 is left free between the motherboard 8 and the bottom of the housing 1 to accommodate the coaxial cables and power cables required in addition to the electrical interconnections on the motherboard and which terminate at special contacts mounted in large-diameter recesses 10 in the plug-in electrical connectors 4, 5, 6 and 7.

Figure 1:
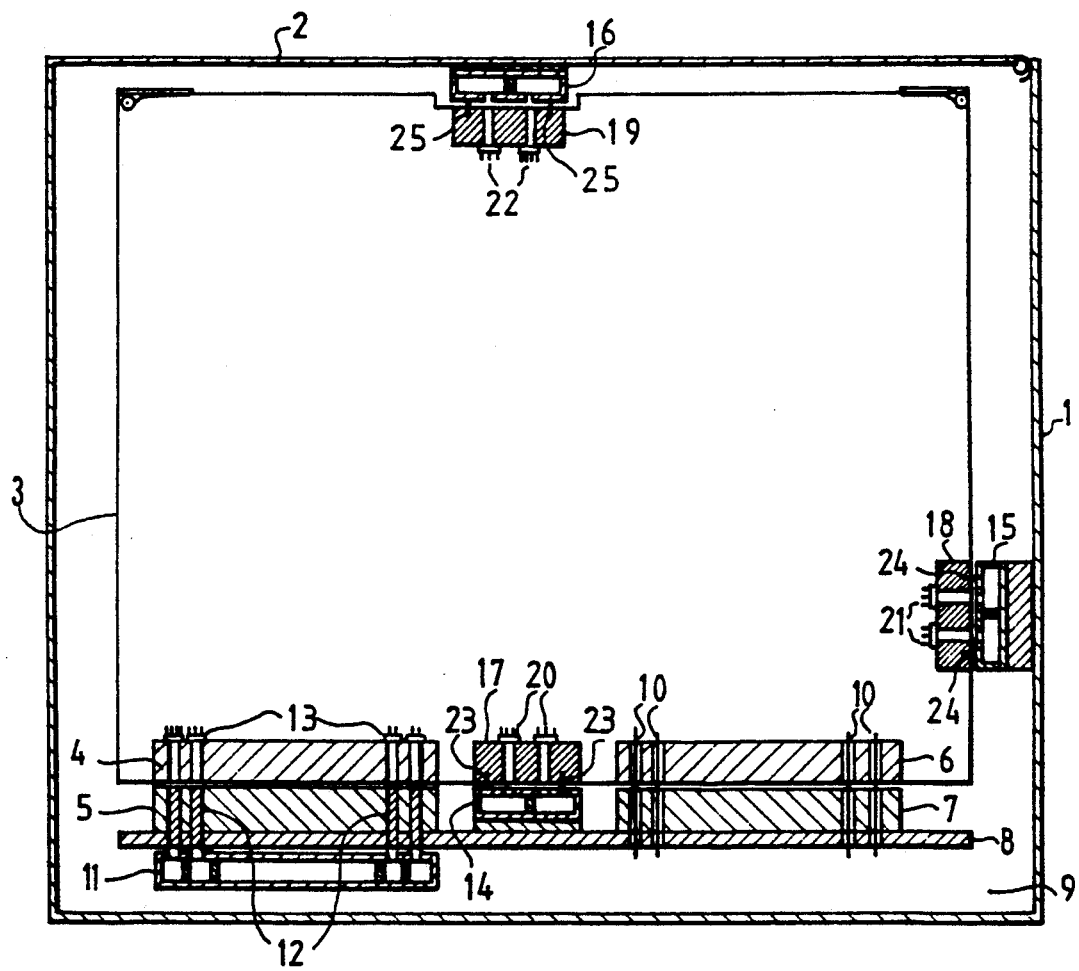
FIG. 1 is a transverse cross-section on a housing for printed circuit boards fitted with optical connection strips complying with the invention.

The density of the electrical connections thus made between daughterboards 3 is, as seen previously, limited by mechanical considerations and the space available for contact while the frequency of the electrical signals transmitted is limited by the significant changes in form at the contact level; they are, therefore, completed by optical interconnections. The optical interconnections are made by optical fibers running in a removable strip placed in the housing, alongside the stack of daughterboards, and optoelectronic coupling devices mounted on the daughterboards. The strip can be mounted on or under motherboard 8 or along one side of housing 1 or again at the top, under the housing 1 lid 2. It contains apertures to accommodate the ends of the optical fibers, these apertures being spaced at the same pitch as daughterboards 3 in the stack.

If the strip 11 is placed under motherboard 8, the apertures for the optical fiber terminations are extended by guide bushes 12 which run through the motherboard 8 and, when necessary, the body of electrical connector 5 mounted on it; these bushes run through the recesses initially provided for coaxial or power cable contacts and terminate flush with the body of the electrical connector 4 on the daughterboard whose corresponding recesses house optoelectronic coupling devices 13.

If strip 14, 15 or 16 is mounted on the motherboard between the plug-in electrical connectors 5 or 7 or on one side of housing 1 or again above daughterboards 3, under cover 2, it may be flat and contain apertures for optical fiber ends which terminate flush with its surface, lying opposite the half-optical connectors 17, 18 and 19 mounted on daughterboards 3, these half-connectors containing recesses housing optoelectronic coupling devices 20, 21 and 22.

The strip 14, 15 or 16 is easily removable and contains locating pins or holes 23, 24 and 25 to correctly position it relative to the optical half-connectors 17, 18 or 19 on daughterboards 3.

Figure 2:
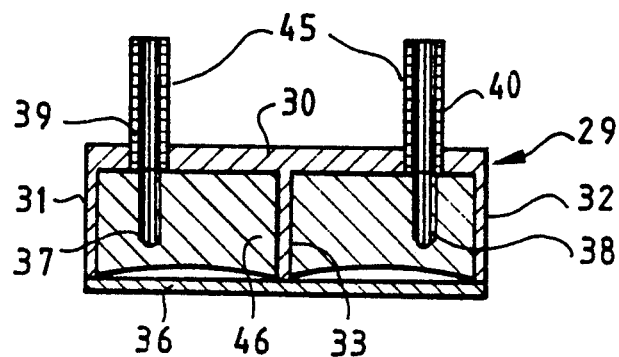
FIGS. 2 and 3 are transverse and longitudinal cross-sections on a type of connection strip complying with the invention.
Figure 3:
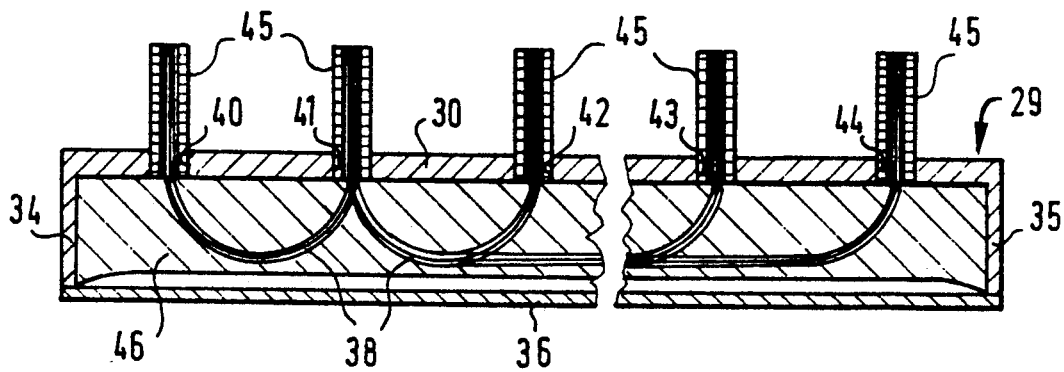

FIGS. 2 and 3 are transverse and longitudinal cross-sections on an optical interconnection strip designed to be mounted beneath a motherboard, along one edge of the stack of printed circuit daughterboards 3 to distribute two high-frequency signals among the daughterboards, each signal providing on-off modulation of a light beam. This strip comprises a housing formed by a U-section 29 with its base 30 turned towards the daughterboards and with two edge flanges 31 and 32. A central web 33 divides the space in the U-section into two channels closed by end plates 34 and 35 and by a lid 36.

The channels accommodate optical fibers 37 and 38 respectively, each fiber transmitting one of the light beams. The base of the section contains apertures 39, 40, 41, 42, 43 and 44 respectively, these apertures being at the same pitch as the spacing of daughterboards 3 and accommodating the terminations of the optical fibers 37 and 38. Apertures 39, 40, 41, 42, 43 and 44 are externally extended by guide bushes 45, the optical fibers 37 and 38 running completely through these bushes and their ends being crimped and polished in the usual way to form optical inputs and outputs.

In each channel, a bundle of optical fibers approx. one millimeter in diameter, consisting of several thousand very small diameter—several dozen microns—optical fibers run from the guide bush 41 in one of the apertures, used as an optical input, and splits into several sub-bundles each containing a few hundred optical fibers, running to other apertures 40, 42, 43 and 44 used as optical outputs. It is consequently very easy to distribute the power in the light signal applied to the single optical input to several optical outputs.

Once optical fibers 37 and 38 are installed, the channels are filled with a material, for example plastic foam 46, to fix the optical fibers. The central web 33 avoids any "cross-talk" between the two bundles of optical fiber 37 and 38 used to transmit two different optical signals.

Figure 4:
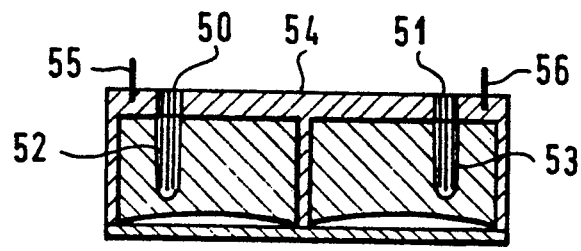
FIG. 4 is a transverse cross-section on another type of optical connection strip complying with the invention.

FIG. 4 is a transverse cross-section on an optical interconnection strip designed to be placed on a motherboard between the electrical connectors into which the daughterboards are plugged or on one side of the housing or again above the daughterboards under the housing lid; it is designed to distribute two high-frequency signals, each providing on-off modulation of a light beam, among the daughterboards. This strip differs from the previous strip in that the apertures 50 and 51 which accommodate the ends of the optical fibers 52 and 53 are not extended by guide bushes but are in the base 54 of the section which houses the fibers and in that it carries locating pins 55 and 56 to correctly position apertures 50 and 51 relative to the recesses in the optical half-connectors on the daughterboards which lie opposite the interconnection strip.

Figure 5:
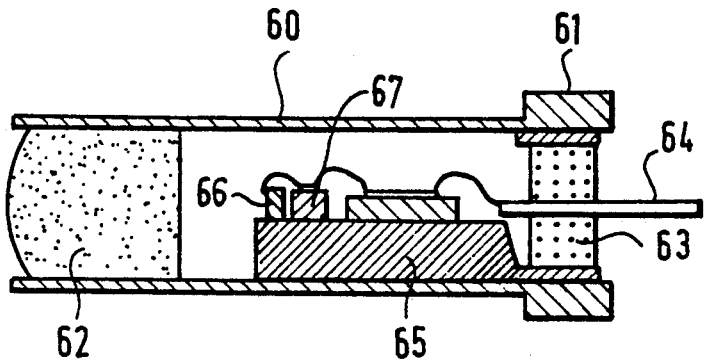
FIG. 5 is a longitudinal cross-section on an optical transmitter or receiver adaptable to the optical inputs or outputs in the optical connection strips represented in FIGS. 2, 3 and 4.

FIG. 5 is a longitudinal cross-section on an optoelectronic detector or transmitter adaptable to the optical inputs or outputs in the optical connection strips shown in FIGS. 2, 3 and 4. It consists of a tubular casing 60, whose diameter matches the recesses in the connector body which contain it. This tubular casing 60 has a shoulder 61 at its rear end to limit its penetration into the recess. Its front end contains a glass lens 62 whose diameter exceeds that of the optical cable bundles which terminate at the optical inputs and outputs in the optical connection strip while its rear end is closed by a glass bead 63 which acts as an insulating support for electrical terminal 64. A semi cylindrical support 65 terminates in a ring, which traps glass bead 63, and also carries either a light-emitting or laser diode, placed in the focal plane of the lens, together with its transmission electronic preamplifier and amplifier, or a PIN diode, placed opposite the lens, and its reception electronic preamplifier and amplifier. If a laser is used, it is soldered directly onto the semi-cylindrical support 65. If a LED or PIN diode 66 is used, it is mounted on a heat radiator 67, which also carries a relay connection terminal.

The main advantages offered by this multi-fiber connection system compared to the conventional single-fiber system, even if multi-mode fibers are used, are firstly that it is far less sensitive to the position of the strip and, secondly, that the bundle of optical fibers can be divided into sub-bundles so that the same light emitter can transmit light energy to several light receivers, this function being extremely difficult to achieve electrically at frequencies between 100 MHz and a few gigahertz.

This is particularly useful to distribute the signal from a single local oscillator to various printed circuit boards in the same housing. The signals distributed can all be in phase provided care is taken to ensure all optical fiber sub-bundles are of the same length; this is easily done by folding the fibers within the strip.

If a very high density of optical inputs or outputs is required on a given daughterboard, it can be achieved by using a single optical fiber, generally multi-mode or, for very high frequencies, mono-mode, for each instead of an optical fiber sub-bundle and mounting these on the base of the optical connection strip forming networks with an internal pitch of approx 0.1 to 1 mm. The strip U-section then forms a veritable connection support which can be placed on a high-precision machine, of the type used for wire-to-wire connection of semiconductors, adapted for use with optical fibers.

Figure 6:
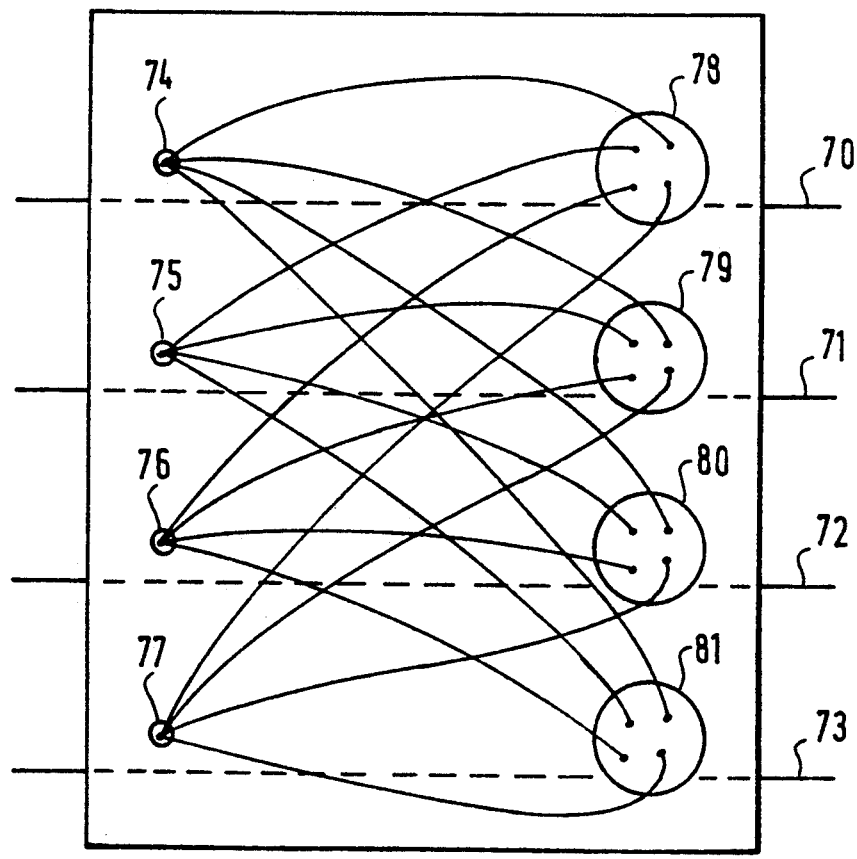
FIG. 6 is a schematic diagram of another type of optical interconnection strip complying with the invention.

FIG. 6 shows the cables in an optical connection strip to interconnect four daughterboards 70, 71, 72 and 73, each with an optical transmitter and a set of four optical receivers which must be connected to the optical transmitters on the four boards.

The optical connection strip has, at each board position, a multi-fiber optical input 74, 75, 76 or 77 respectively at which terminates a bundle of four optical fibers and a network 78, 79, 80 or 81 respectively of four single-fiber optical outputs at which terminate four fibers originating from the four multi-fiber optical inputs 74, 75, 76 and 77.

The ends of the fibers in each bundle can be melted together at each optical input 74, 75, 76 or 77, as is done in optical fiber couplers; this improves the input coupling and the uniformity of outputs.

Each single-fiber optical outlet network consists of a network of apertures drilled in the base of the strip at a pitch of approx 0.1 to 1 mm, the end of an optical fiber running through each aperture and all ends of optical fibers from the network of apertures being cut flush and then all polished together. In front of each network of apertures for the single-fiber optical inputs or outputs there is a network of microlenses, positioned on the same pitch, to convert the light beam output by or input to an optical fiber into a wider, virtually parallel, beam to make the connection less sensitive to any errors in position.

Obviously, when a large number of optical inputs are required for a given daughterboard, the optical inputs for this board, and the optical outputs, can be grouped on the strip into a regular network with a pitch of approx 0.1 to 1 millimeter.

Figure 7:
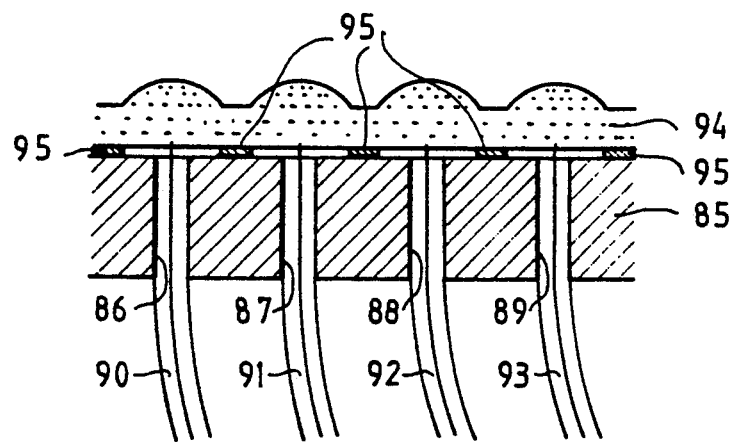
FIG. 7 is a cross-section on the optical output network in an optical interconnection strip of the type shown in FIG. 6.

FIG. 7 shows a method of installing a network of microlenses on a network of apertures at which optical fibers terminate. The cross-section shows the base 85 of an optical connection strip containing a regularly spaced network of four apertures 86, 87, 88 and 89, containing the ends of four optical fibers 90, 91, 92 and 93, and a network of microlenses 94 accurately positioned opposite the ends of the optical fibers. The microlens networks 94 are produced by a known technique, similar to that used to manufacture integrated circuits, consisting of applying a selective mask, comprising disks at the positions of the future lenses, to a sheet of glass with flat parallel faces and then exposing areas outside these disks to ultraviolet radiation, after which the glass sheet is annealed in an oven; during annealing, the areas exposed to ultraviolet radiation contract and thus, by a mechanical effect, form lenses at the disk positions.

The microlens network 94 can be accurately positioned opposite the network of apertures 86, 87, 88 and 89, so that each microlens is centered on the end of an optical fiber, and attached to the optical connection strip base using, for example, the "bump" technique. This involves isolating small conductive pads on the outer surface of base 85, between the network apertures, and reproducing these same pads on the corresponding face of the microlens network 94; half-microbeads of lead-tin solder are then grown on the base conductive pads by electrolysis, the microlens network 94 is placed on base 85 and the solder 95 is melted between the pads on the base 85 and those on the microlens network 94; the two parts automatically align due to the suction effect of the lead-tin solder which tends to draw the two sets of pads in line with each other as far ar possible.

Figure 8:
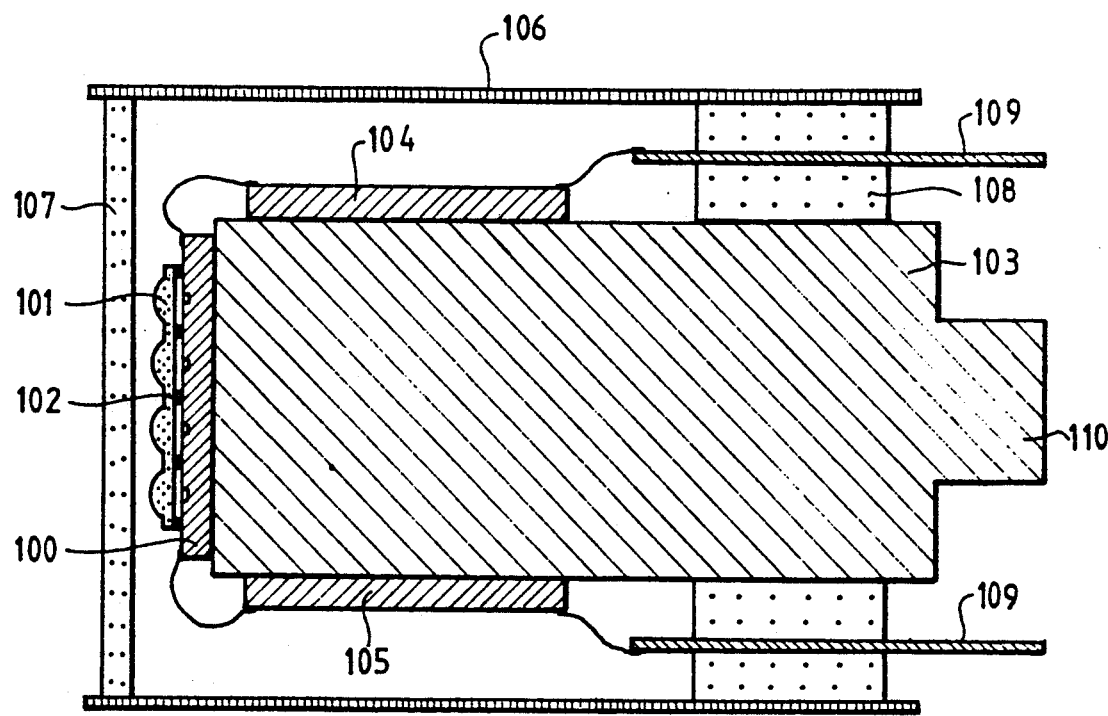
FIG. 8 is a longitudinal cross-section on a network of optical transmitters or receivers adaptable to an optical input or output network of the type shown in FIG. 7.

FIG. 8 is a transverse cross-section on a network of optoelectronic transmitters or detectors which can be adapted to an optical input or output network on the optical connection strip described for the previous figure. This comprises either a network of light-emitting or laser diodes in the case of optical transmitters or PIN diodes in the case of optical receivers, all produced on the same substrate 100 due to the very small pitch. To facilitate coupling to a network of optical inputs or outputs, this diode network is capped by a network of microlenses 101 accurately positioned by solder points 102 between facing conductive pads using the technique described previously. Substrate 100, which carries the diode network, is placed on the front face of a metal base 103 which serves as a heat radiator and the electrical ground. The side faces of metal base 103 also carries substrates 104 and 105 on which are etched transmission preamplifiers and amplifiers, in the case of a LED or laser network, or reception preamplifiers and amplifiers for a network of PIN diodes. The assembly consisting of the dissipating base 103, the substrates 100, 104 and 105 which it carries and the microlens network 101 is mounted in a sealed protective housing 106 whose front face carries a glass sheet 107 mounted in front of the microlens network 101 and with the rear face closed by an annular glass bead 108 through which run contact pins 109, connected to the electrical terminals on the circuits etched on substrates 104 and 105, and a lug 110 from the dissipating base 103, this lug also forming the shortest possible general grounding point.

The sealed housing 106 described above is, in particular, designed to be mounted in a special optical half-connector, with locating pins, adapted to a flat optical connection strip with no guide bushes, mounted on the backplane motherboard between the electrical connectors or on the sides or on the top edge of the daughterboards.

The advantage of this single-fiber connection technology using single-fiber optical input or output networks lies in the possibility of considerably increasing the density of optical connections compared to that achievable with the multi-fiber optical connection technique. On the other hand, it is not easy to divide the power and, when employed alone, standard optical couplers, mounted on the back of the optical connection strip section, must be used.

The special case of optical connections which combine single and multi-fiber optical connections, described with reference to FIG. 6, is particularly interesting since it is then possible to produce an electrically-controlled optical crossbar by fitting selection circuits to the optical receiver networks.

What we claimed is:

1. An optical strip to interconnect a set of printed circuit boards (3) mounted in a housing (1), the strip comprising:
    a U-section (29) mounted alongside and against one edge of the printed circuit boards (3) with its back (30) turned towards the circuit boards (3), the section having two lateral flanges (31 and 32) and containg apertures (39, . . . , 44) drilled at the same pitch as the printed circuit boards (3) are spaced and
    optical fibers (37 and 38) placed in the U-section (29) and running from one aperture (39, . . . , 44) to another, each aperture (39, . . . , 44) in the back (30) of the U-section (29) accomodating one or several optical fiber (37, 38) ends positioned opposite half an optical connector mounted on the edge of one of the set of printed circuit boards (3).

2. A strip as claimed in claim 1, designed to couple several parallel optical outputs (40, 42, 43, 44) to a single optical input (41), wherein a bundle of optical fibers (38), originates at the said optical input (41) located in an aperture drilled in the back (30) of the U-section (29) and aligned with an optical half-connector mounted on the edge of a printed circuit board (3) carrying an optoelectronic transmitter, this bundle being divided into sub-bundles of optical fibers each running to one of the said optical outputs (40, 42, 43, 44) located in other apertures drilled in the back (30) of U-section (29) opposite optical semiconnectors mounted on the edge of printed circuit boards (3) and including optoelectronic receivers.

3. A strip as claimed in claim 1, designed to individually connect in parallel several optical inputs to separate groups of optical outputs, wherein longitudinal webs (33) partition the inside of the U-section (29) into as many channels as there are optical inputs, each channel being used to accommodate the optical fibers (37, 38) which connect one optical input to its group of optical outputs and whose back contains apertures corresponding to the said optical input and the said group of optical outputs.

4. A strip as claimed in claim 1, wherein the ends of the optical fibers (52, 53) terminate at the back (54) of the U-section, flush with the apertures (50, 51) drilled in this back.

5. A strip as claimed in claim 1, further comprising guide bushes (45) attached to the back (30) of the U-section (29) at the position of the apertures which contain the ends of the optical fibers (37, 38).

6. A strip as claimed in claim 5, wherein the ends of the optical fibers (37, 38) terminate at the back (30) of the U-section (29), flush with the ends of guide bushes (45).

7. A strip as claimed in claim 5, to interconnect a set of printed circuit boards (3) plugged into electrical connectors (5, 7) mounted on a backplane (8) by their edge, wherein the strip (11) is positioned on the back of the board cage (8) with its guide bushes (12) running through the cage (8) and electrical connectors (5, 7) to terminate opposite optical semi-connectors mounted on the printed circuit boards (3).

8. A strip as claimed in claim 1 to interconnect a set of printed circuit boards (3) whose edges are plugged into electrical connectors (5, 7) mounted on a backplane (8), the said strip (14) being mounted on the backplane (8) alongside electrical connectors (5, 7).

9. A strip as claimed in claim 1 for a set of printed circuit boards (3) whose edges are plugged into electrical connectors (5, 7) mounted on a backplane (8), wherein the said strip (15) is mounted to one side of the set of printed circuit boards (3), i.e. laterally relative to the backplane (3).

10. A strip as claimed in claim 1 to interconnect a set of printed circuit boards (3) whose edges are plugged into electrical connectors (5, 7) mounted on a backplane (8), wherein the said strip (16) is mounted above the printed circuit boards (3) relative to the backplane (8).

11. A strip as claimed in claim 1, wherein the U-section carries locating devices (23, 24, 25, 55, 56) to correctly locate it relative to the optical half-connectors (17, 18, 19) on the printed circuit boards.

12. A strip as claimed in claim 1, designed to couple multiple optical outputs, grouped at the edge of a printed circuit board (3), to optical inputs, the said strip containing apertures for optical outputs located on the edge of a given printed circuit board (3), the said apertures accommodating the ends of optical fibers arranged in a network with a pitch of approx 0.1 to 1 millimeter and lying opposite a network of optoelectronic receivers, positioned at the same pitch and produced on the same integrated circuit substrate.

13. A strip as claimed in claim 1, designed to couple multiple optical inputs, grouped at the edge of a printed circuit board (3) to optical outputs, the said strip containing apertures for optical inputs located on the edge of a given printed circuit board (3), the said apertures accommodating the ends of optical fibers arranged in a network with a pitch of approx 0.1 to 1 millimeter and lying opposite a network of optoelectronic transmitters, positioned at the same pitch and produced on the same integrated circuit substrate.

14. A strip as claimed in claim 12 or claim 13 which includes, on its back, lying opposite a network of apertures for optical outputs or inputs on the edge of a given printed circuit board (3), networks (94) of coupling microlenses, the optoelectronic receiver or transmitter networks lying opposite them also being fitted with networks (101) of coupling microlenses to increase the optical coupling location tolerances.

15. A strip as claimed in claim 1 which includes a packing material (46) which fills the voids in the U-section (29) around the optical fibers (37,38).

16. A strip as claimed in claim 1 and including a lid (36) to close the inside of the U-section (29).

17. A strip as claimed in claim 1, wherein section (29) is in metal.

18. A strip as claimed in claim 1, wherein section (29) is in a plastic material reinforced by a composite material.

19. A strip as claimed in claim 12, designed to couple an optical input to optical outputs grouped on the edges of printed circuit boards (3) forming a network with a pitch of approx 0.1 to 1 millimeter, which includes a bundle of optical fibers originating from the said optical input, each fiber running to one of the optical outputs grouped on the edges of printed circuit boards (3).

20. A strip as claimed in claim 19, wherein the bundle fibers are melted together at the optical input position.

21. A strip as claimed in claim 1, wherein the half-connector, lying opposite an aperture drilled in the back of its U-section and which gives access to optical fibers, includes a tubular casing (60) closed at one end by a lens (62) and housing a semi-cylindrical support (65) which terminates in a ring to retain a glass bead (63) used to insulate electrical connections (64), the said support carrying a laser diode, a LED or a PIN diode (66) placed at the lens (62) focal plane, and the associated electronic circuits.

22. A strip as claimed in claim 21, wherein a small heat radiating cube (67) is installed between the LED or PIN diode (66) and the semi-cylindrical support.

23. A strip as claimed in claim 1 which includes optical inputs or outputs grouped into networks, wherein there is an optical half-connector opposite each input or output network and which includes several laser, light-emitting or PIN diodes arranged into a network with the same configuration and mounted on the same subtrate (100).

* * * * *